(12) United States Patent
Hu et al.

(10) Patent No.: US 6,366,721 B1
(45) Date of Patent: Apr. 2, 2002

(54) TUNABLE OPTICAL FIBER GRATING

(75) Inventors: Chieh Hu, Taichung; Shu-Mei Yang, Taichung Hsien; Jiun-Shyong Wu, Taoyuan Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/490,023

(22) Filed: Jan. 21, 2000

(30) Foreign Application Priority Data

Nov. 4, 1999 (TW) .......................................... 88119200

(51) Int. Cl.⁷ ................................................ G02B 6/34
(52) U.S. Cl. ............................................. 385/37; 385/39
(58) Field of Search ................................ 385/37, 31, 39

(56) References Cited

U.S. PATENT DOCUMENTS 3,916,348 A * 10/1975 Toda et al. ................... 333/30
4,656,421 A * 4/1987 Ellis et al. ................... 324/244
4,705,354 A * 11/1987 Ulrich ....................... 350/96.29
5,053,693 A * 10/1991 Bohnert et al. ............... 324/96
5,305,336 A * 4/1994 Adar et al. ................... 372/18
5,978,539 A * 11/1999 Davies et al. ................ 385/129

* cited by examiner

Primary Examiner—Frank G. Font
Assistant Examiner—Michael P Mooney
(74) Attorney, Agent, or Firm—J.C. Patents

(57) ABSTRACT

The invention provides a structure of tunable optical filter grating. The structure includes a bimetallic strip and a compression spring to set up suitable strain for adjusting the position of the central wavelength. The bimetallic strip can also be specially designed to compensate for any drift in central wavelength due to temperature change so that temperature monitoring and feedback control designs is obsolete. Therefore, the operating wavelength of the optical grating is adjustable yet insensitive to temperature changes.

10 Claims, 3 Drawing Sheets

TUNABLE OPTICAL FIBER GRATING

CROSS-REFERENCE TO RELATED APPLICATION

This application claims the priority benefit of Taiwan application serial no. 88119200, filed Nov. 4, 1999.

BACKGROUND OF THE INVENTION

1. Field of Invention

The present invention relates to an optical fiber grating. More particularly, the present invention relates to an optical fiber grating capable of filtering light wave around a central wavelength with position of the central wavelength being adjustable.

2. Description of Related Art

Following rapid progress in high-density wavelength division multiplexing techniques for optical transmission, the ability to extract or insert signals at a definite wavelength at a particular node point become increasing important. To increase the variability of transmission capacity, optical designs with wavelength regrouping capability is in great demand.

Bragg type of optical grating has an optical core whose refractive index varies cyclically. Cyclically varying refractive index is generated by crossing two ultraviolet light beams so that interference lines are formed within the optical fiber. Alternatively an ultraviolet light beam is shone on a photomask to produce the interference lines in the optical fiber. Due to the photosensitivity of optical fibers, variation in refractive index is achieved.

When an incoming light beam transmitted through an optical fiber grating and if one of the wavelengths within the incoming light beam satisfies the Bragg condition, that particular wavelength will be reflected (in other words, same as the central wavelength of the optical grating). In general, the central wavelength reflected from the optical grating is twice the average effective refractive index times the period of refractive change. On the other hand, wavelengths that do not satisfy the Bragg condition will just pass through the optical grating.

As temperature around the optical grating changes, corresponding changes in the refractive index will lead to a shift in the central wavelength of reflection. For an optical grating that operates at a wavelength of 1550 nm, the wavelength/temperature coefficient is about 0.012 nm/° C. In other words, for every 1° C. change in temperature, the central wavelength will shift by 0.012 nm.

In addition, forces acting on the optical grating change, both the refractive index and the period of fiber grating will be affected leading also to a shift in the central wavelength of reflection. For an optical grating that operates at a wavelength of 1550 nm, the wavelength/strain coefficient is about 1.2 nm/millistrain.

Due to possible strain and temperature changes, consideration must be made with regard to the application of the optical grating. For example, in U.S. Pat. No. 5,694,503, the optical grating is fastened onto a ceramic plate that has a negative coefficient of thermal expansion. Furthermore, in U.S. Pat. No. 5,841,920 and World Intellectual Property Organization Patent No. WO9827446, an assembled structure consisting of two components having very different coefficient of thermal expansion are used to produce a negative coefficient of thermal expansion. Both types of inventions are applied to an optical grating working at a fixed wavelength. Strain produced by temperature change in the ceramic plate or the assembled structure is capable of compensating for the drift in central wavelength. In other words, drift in wavelength is minimized when temperature around the optical grating changes, or equivalently, the wavelength/temperature coefficient is reduced.

In addition, methods of adjusting the central wavelength of an optical grating are also developed. For example, in U.S. Pat. No. 5,812,711, changes in magnetic strain is used to adjust the operating wavelength of the optical grating. In U.S. Pat. No. 5,469,520, the optical grating is strained to adjust the operating wavelength. On the other hand, in European Patent No. EP0867736, the optical grating is heated to adjust the operating wavelength.

As the number of multiplexing channels is increased, channel spacing has been reduced from about 1.6 nm to just under 0.4 nm. Consequently, position of the central wavelength must be very precise and tolerance of the central wavelength has to be lower than ±0.025 nm. If the heating method is used to adjust operating wavelength, power for heating up the grating has to be constantly supplied. If piezoelectric material (for example, lead zirconium titanium oxide $PbZrTiO_3$ or PZT) is used to adjust operating wavelength, constant power supply is also needed. If the magnetic flux method is used to adjust operating wavelength, although power is needed only when adjustment is required, consideration must still be made regarding the wavelength/temperature coefficient and the thermal expansion coefficient of the magnetic material. Finally, if operating wavelength is adjusted by straining the optical fiber in the axial direction, the resolution of the mechanic has to be in the micrometer range. Therefore, demands in manufacturing precision are exceptionally high.

In all the aforementioned methods of adjusting the central wavelength of an optical grating, drift in central wavelength due to a temperature change is still ignored. In other words, even if the operating wavelength has been precisely set, any changes in temperature may still cause some undesirable drifting.

SUMMARY OF THE INVENTION

Accordingly, one object of the present invention is to provide an optical fiber grating that uses a bimetallic strip and a compression spring to position the central wavelength of reflection for an incoming light beam. In addition, the grating is capable of offsetting any drifting of the central wavelength due to a temperature change.

A second object of this invention is to provide an optical fiber grating whose central wavelength of reflection can be adjusted yet quite insensitive to temperature fluctuation. Hence, there is no need for monitoring surrounding temperature and performing feedback control actions constantly.

To achieve these and other advantages and in accordance with the purpose of the invention, as embodied and broadly described herein, the invention provides an adjustable light-reflecting component. The light-reflecting component includes a waveguide that constrains and transmits an incoming light beam. The light-reflecting component is incorporated with the waveguide for reflecting incoming light signals around a central wavelength of the light-reflecting component. The light-reflecting component is fastened onto one side of a bimetallic strip. Any deformation of the bimetallic strip will cause some strain in the light-reflecting component and lead to a shift in the central wavelength of the reflected light signals. In addition, differences in coefficient of thermal expansion between the two metallic strips of the bimetallic strip will produce bending stress that can almost compensate for any drift in central wavelength when the temperature changes. One end of an elastic prop is attached to one side of the bimetallic strip while the other end is attached to a drawing point. Therefore, the bimetallic strip is bent by a force transmitted through the elastic prop.

The invention also provides an adjustable optical fiber grating system. The system includes a bimetallic strip formed by joining the flat surfaces of a first and a second metallic strip respectively. The coefficient of thermal expansion of the first metallic strip is smaller than the second metallic strip. The system also includes an optical fiber that incorporates an optical grating for reflecting incoming light signals around a central wavelength. The optical fiber grating is fastened onto one side of the first metallic strip so that any deformation of the bimetallic strip will cause some strain inside the grating and ultimately will result in a shift in the central wavelength. Furthermore, differences in the coefficient of thermal expansion between the two metallic strips will result in a bending stress in the bimetallic strip capable of compensating almost any drift in central wavelength due to a temperature change. One end of an elastic prop is in contact with one side of the second metallic strip while the other end is attached to a drawing point. Hence, the bimetallic strip is bent by a force transmitted through the elastic prop.

The invention also provides a method for adjusting an adjustable light-reflecting component. The method includes the steps of providing a waveguide having a light-reflecting component capable of reflecting incoming light signals around a central wavelength. A bimetallic strip with the light-reflecting component attached to one surface of the bimetallic strip is next provided such that any deformation of the bimetallic strip will cause some strain in the light-reflecting component. Furthermore, deformation in the bimetallic strip due to a temperature change can be used to offset any drift in the central wavelength of reflection due to the temperature fluctuation. Finally, an elastic prop is provided for exerting a force on the side of the bimetallic strip so that the resulting deformation in the bimetallic strip can be used to adjust the central wavelength of reflection for the light-reflecting component.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
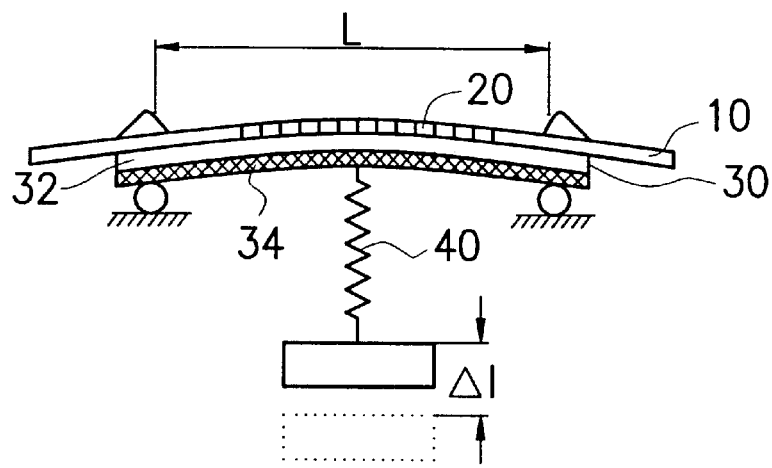
FIG. 1 is a sketch showing an adjustable optical fiber grating system according to a first embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a sketch showing an adjustable optical fiber grating system according to a first embodiment of this invention. As shown in FIG. 1, the adjustable optical fiber grating system at least includes an optical fiber 10, an optical grating, a bimetallic strip 30 and a compression spring 40.

The optical fiber (waveguide) 10 is a light conduit that guides and transmits a beam of incoming light. The optical grating (light-reflecting component) 20 is incorporated into the optical fiber 10 so that a portion of the incoming light signals around a central wavelength is reflected while the remaining portion of the incoming light signals is transmitted through. The optical grating 20 is fastened onto a surface of the bimetallic strip 30. Hence, when the bimetallic strip 30 deforms due to the application of an external force or a change in temperature, the optical grating 20 will similarly be strained. Straining the optical grating 20 will result in a shift in the filtered wavelength by the optical grating 20.

The bimetallic strip 30 carries out two major functions:

1. The coefficient of thermal expansion of the first metallic strip 32 of the bimetallic strip 30 is smaller than the second metallic strip 34 of the bimetallic strip 30. Since the first metallic strip 32 and the second metallic strip 34 are attached side by side to each other, the bimetallic strip 30 will bend downward when the temperature rises to a high temperature. Conversely, the bimetallic strip 30 will bend upward when the temperature drops to a low temperature. The degree of bending is proportional to length of the bimetallic strip 30 and the temperature change while inversely proportional to the thickness of the metallic strips 32 and 34. Through the differential expansion of each metallic strip with respect to an increase in temperature, shift in the central wavelength of reflection for the optical grating 20 due to a rise in temperature can be automatically compensated.

2. Since the central wavelength of reflection for the optical grating 20 shifts when the optical fiber 10 is subjected to tension, a compression spring (an elastic prop) 40 can be installed to provide tension to the optical fiber 10. A force is applied to the side of the bimetallic strip 30 through the compression spring 40 so that the amount of tension inside the optical grating 20 can be changed. By varying the applied force on the compression spring 40, the desired central wavelength of reflection can be obtained.

A relationship between the bimetallic strip 30 and the compression spring 40 can be derived from structural mechanics. The relationship between strain and temperature can be given by the following formula:

$$\Delta \epsilon = \alpha \Delta l + \beta \Delta T;$$

where $\alpha =$ $$\alpha = \frac{8yLk}{L^3 k + 4Ebt^3}, \quad \beta = -\frac{8y a E b t^2}{L^3 k + 4Ebt^3},$$

Δε: strain on the surface of the bimetallic strip;
Δl: drawing distance of the compression spring;
ΔT: change in external temperature;
y: distance between the outer surface and the neutral surface of the bimetallic strip;
a: deflection constant of the bimetallic strip;
b: width of the bimetallic strip;
t: thickness of the bimetallic strip;
L: length of the bimetallic strip;
E: the elastic modulus of the bimetallic strip;
k: the elastic modulus of the compression spring.

According to the above formula, the addition of the compression spring 40 will lower the negative thermal expansion of the bimetallic strip 30. Hence, when suitable materials are chosen to form the bimetallic strip 30 and the compression spring 40, the drift in central wavelength of reflection for the optical grating 20 due to temperature changes can be reduced to a minimum.

Figure 2:
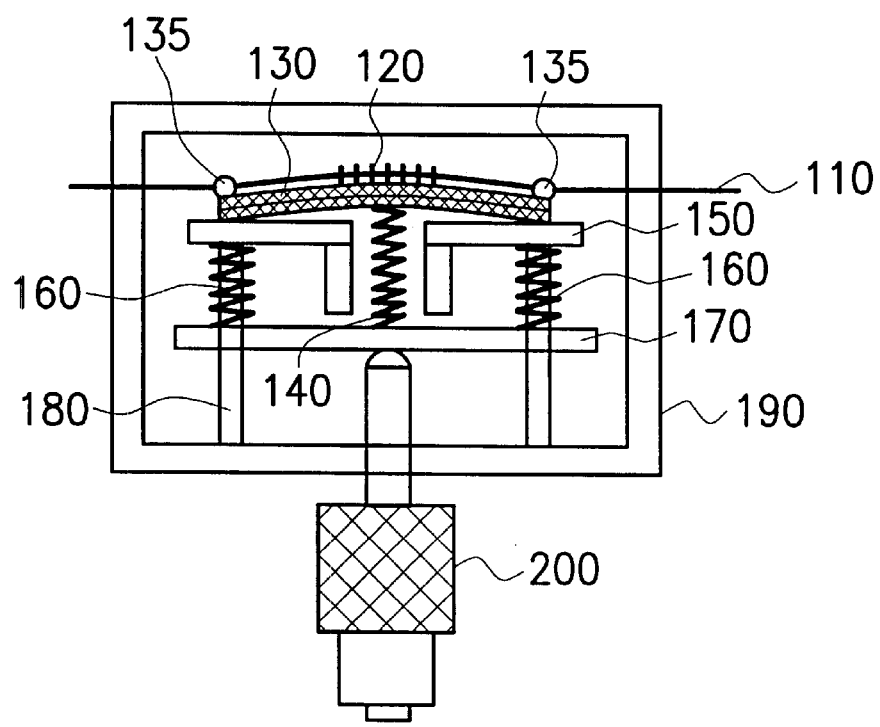
FIG. 2 is a sketch showing an adjustable optical fiber grating system according to a second embodiment of this invention.

FIG. 2 is a sketch showing an adjustable optical fiber grating system according to a second embodiment of this invention. As shown in FIG. 2, the adjustable optical fiber grating system includes an optical fiber 110, an optical grating 120, a bimetallic strip 130, a compression spring 140, a supporting stand 150, a pair of side springs 160, a movable plate 170, a pair of guiding tracks 180, an outer casing 190 and a micrometer drive 200.

The bimetallic strip 130 is positioned on the supporting stand 150, and the optical fiber 110 including the optical grating 120 are affixed to the upper surface of the bimetallic strip 130. When the micrometer drive 200 rotates, distance of separation between the movable plate 170 and the supporting stand is changed. Hence, the degree of bending and the amount of straining on the bimetallic strip 30 through the compression spring 40 are modified. Consequently, the central wavelength of reflection for the optical grating 120 is shifted.

Figure 3:
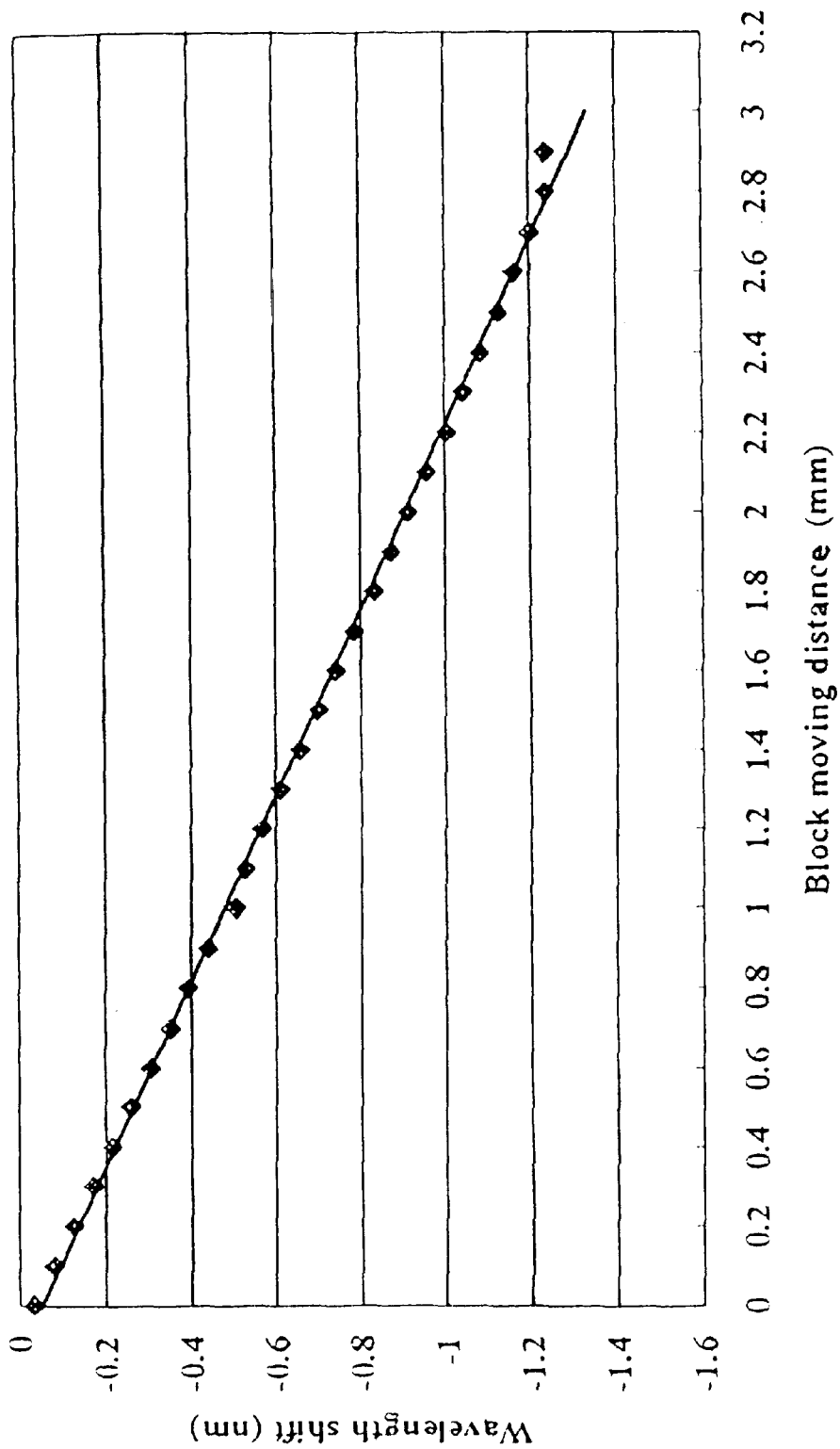
FIG. 3 is a graph of central wavelength versus distance traveled by the moving plate of an adjustable optical grating system.

FIG. 3 is a graph of central wavelength versus distance traveled by the moving plate of an adjustable optical grating system. As shown in FIG. 3, the slope in the graph is about 0.42 nm/mm when the temperature is kept constant. By forming a structure composed of a bimetallic strip and a compression spring as shown in FIG. 2, a linear relationship between the shift of central wavelength and the moving distance of the moving plate is obtained. In fact, the degree of shifting of the central wavelength can be finely adjusted using the micrometer drive 200. If the resolution of the micrometer in the micrometer range, ultimate resolution of the wavelength can be as small as 0.42 pm. In this embodiment, the desired shifting range is about 1.2 nm. Since the shifting range is related to the maximum strain in both the bimetallic strip 130 and the compression spring 140, the desired shifting range can be obtained by proper design and selection of materials.

Figure 4:
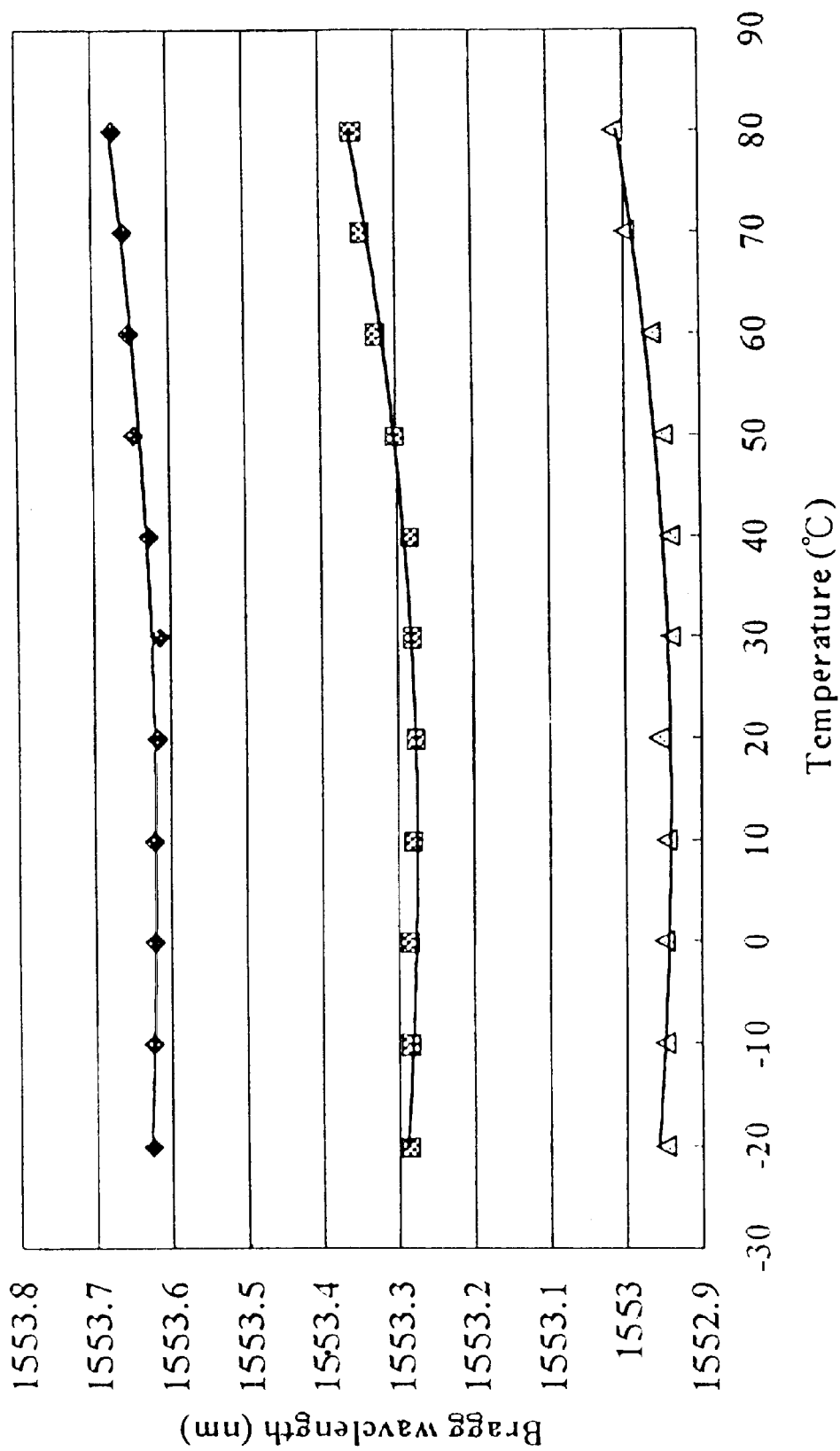
FIG. 4 is a graph of central wavelength versus temperature showing the drift in central wavelength of an adjustable optical grating for three different central wavelength settings.

FIG. 4 is a graph of central wavelength versus temperature showing the drift in central wavelength of an adjustable optical grating for three different central wavelength settings. According to the strain versus temperature formula, the addition of the compression spring 140 will lower the negative thermal expansion of the bimetallic strip 130. However, the overall thermal expansion is linear. Hence, by designing suitable bimetallic strip 130 and compression spring 140, the optical grating 120 can work within different central wavelengths. In other words, a working central wavelength can be selected such that any variation in central wavelength due to temperature change can be compensated by the bimetallic strip 130. For example, the wavelength/temperature coefficient can be as small as 0.001 nm/° C. as shown in FIG. 4.

In summary, this invention provides an adjustable optical grating system that utilizes the combination of a bimetallic strip and a compression spring. The system not only provides a range of central wavelengths, but also prevents any drifting in central wavelength due to a change in temperature. Another advantage of this invention is that no constant monitoring and feedback of the central wavelength is necessary. Consequently, no special setups for feedback control are needed and part of the production cost is saved.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjustable light-reflecting component, comprising:

a waveguide that constrains and transmits an incoming light beam;

a light-reflecting component incorporated with the waveguide for reflecting incoming light signals around a central wavelength;

a bimetallic strip for attaching the light-reflecting component such that any deformation of the bimetallic strip will cause some strain in the light-reflecting component and lead to a shift in the central wavelength of the reflected light signals in addition, differences in coefficient of thermal expansion between the two metallic strips of the bimetallic strip will produce bending stress large enough to compensate for almost any drift in central wavelength due to a temperature change; and an elastic prop having a first end in contact with one side of the bimetallic strip and a second end attached to a drawing point so that the bimetallic strip is bent by the force applied through the elastic prop.

2. The adjustable light-reflecting component of claim 1, wherein the waveguide includes an optical fiber.

3. The adjustable light-reflecting component of claim 1, wherein the light-reflecting component includes an optical fiber Bragg grating.

4. The adjustable light-reflecting component of claim 1, wherein the elastic prop includes a compression spring.

5. An adjustable optical fiber grating system comprising:

a bimetallic strip formed by joining the flat surfaces of a first metallic strip and a second metallic strip together, wherein the coefficients of thermal expansion for the first metallic strip and the second metallic strip are different;

an optical fiber having an optical grating for reflecting incoming light signals around a central wavelength, wherein the optical grating is mounted on one side of the first metallic strip so that any deformation of the bimetallic strip will cause some strain inside the grating and ultimately results in a shift in the central wavelength, furthermore, a difference in coefficient of thermal expansion between the two metallic strips will result in a bending stress in the bimetallic strip that can almost compensate for any drift in central wavelength due to a temperature change in the optical grating; and an elastic prop having a first end in contact with the second metallic strip and a second end attached to a drawing point so that the bimetallic strip is bent through the force applied to the first end of the elastic prop.

6. The adjustable optical fiber grating of claim 5, wherein the elastic prop is a compression spring.

7. A method for adjusting an adjustable light-reflecting component, comprising the steps of:

provide a waveguide having a light-reflecting component capable of reflecting incoming light signals around a central wavelength;

providing a bimetallic strip with the light-reflecting component attached to one surface of the bimetallic strip such that any deformation of the bimetallic strip will cause some strain in the light-reflecting component, furthermore, deformation in the bimetallic strip due to a temperature change can be used to offset any drift in the central wavelength of reflection for the light-reflecting component due to the same temperature change; and providing an elastic prop that exerts a force on the side of the bimetallic strip so that the resulting deformation in the bimetallic strip can be used to adjust the central wavelength of reflection for the light-reflecting component.

8. The method of claim 7, wherein the waveguide includes an optical fiber.

9. The method of claim 7, wherein the light-reflecting component includes an optical fiber Bragg grating.

10. The method of claim 7, wherein the elastic prop includes a compression spring.

\* \* \* \* \*